United States Patent [19]

Pugh et al.

[11] Patent Number: 5,534,734
[45] Date of Patent: Jul. 9, 1996

[54] POWER SHEDDING DEVICE

[75] Inventors: William C. Pugh, Manchester; John M. McNally, University City, both of Mo.

[73] Assignee: Compusci, Inc., Fenton, Mich.

[21] Appl. No.: 164,160

[22] Filed: Dec. 9, 1993

[51] Int. Cl.$^6$ ......................................................... H02J 3/14
[52] U.S. Cl. ............................. 307/38; 307/39; 307/40; 307/66; 364/273.1; 364/273.2; 364/273.3; 364/273.4; 364/273.5; 364/492
[58] Field of Search .................... 307/38, 39, 40, 307/66; 364/273.1, 278.2, 273.3, 273.4, 273.5, 492

[56] References Cited

U.S. PATENT DOCUMENTS

| | | | |
|---|---|---|---|
| 4,161,028 | 7/1979 | Davis et al. | 364/492 |
| 4,283,635 | 8/1981 | Balmer | 307/35 |
| 4,385,241 | 5/1983 | Peddie et al. | 307/31 |
| 5,347,164 | 9/1994 | Yeh | 307/66 |

OTHER PUBLICATIONS

Installation and User's Guide, Power Edge® Smart Socket®1993 CompuSci, Inc. Oct. 21, 1993.

*Primary Examiner*—William M. Shoop, Jr.
*Assistant Examiner*—Albert W. Palavini
*Attorney, Agent, or Firm*—Polster, Lieder, Woodruff & Lucchesi

[57] ABSTRACT

A power shedding device controls the application of power from an uninterruptible power supply (UPS). It includes circuitry for detecting an alarm signal indicative of a condition requiring the rationing of power from the UPS, and a plurality of power outlets for connection to a plurality of loads such as computers, printers, and other associated devices. A microprocessor controls the application of power to each power outlet pursuant to program control such that the application of power to a first power output is independent of the application of power to a second power output. Manually operable switches are provides for presetting shedding profiles for the power outlets during a shutdown procedure. The processor is responsive to receipt of an alarm signal to shed each power output in accordance with its corresponding manually preset shedding profile. A low UPS battery alarm results in an override of the shedding profiles if the remaining time to shutdown for an outlet exceeds a predetermined limit. The processor is responsive to alarms from the UPS as well as to an auxiliary alarm. The power shedding device may be used with existing UPS monitoring software without modification. Power outlets are also manually selectable or deselectable by the user if desired. In addition provision is made for power recycling of all power outlets regardless of when power returns.

20 Claims, 6 Drawing Sheets

POWER SHEDDING DEVICE

BACKGROUND OF THE INVENTION

This invention relates to computer and environmental systems, and more particularly relates to power shedding during extended power outages.

Uninterruptible power supplies (UPS) are known which provide power to equipment such as computer and telephone equipment during power grid outages. These devices include an auxiliary source of power, such as a battery, which charges while the power grid is in operation, and which provides power to the computer or other equipment during power outages. Being battery based, these devices have only a relatively lifted amount of power available before the computer or other devices must be shut down. Once the battery has discharged (total power failure), it is too late to shut down the computer or other equipment.

A UPS typically has several electronic devices connected thereto. For example, a computer, an associated printer, and an associated monitor may all be supplied power from a single UPS. It should be appreciated that some devices are more important than others in terms of the criticality of keeping them powered up during a power outage. Moreover, different devices have different power requirements, which can result in faster than necessary discharge of the UPS battery. However, the particular devices to be connected to a UPS cannot in general be known in advance, so it is difficult to build a UPS which will shed the desired loads at the desired times and in the desired order.

Many UPS devices include a set of output contacts which provide alarm signals, such as low battery alarms and power failure alarms. Software has been designed to monitor these alarms and use that information to perform a controlled shut down of the connected equipment. Thus, although it would be desirable to use these alarm contacts for other purposes, it is important that they be left for use of the existing software.

In certain circumstances, it is important that the selection and deselection of outlets be manually changeable, but this is not readily accomplished with reasonably priced UPSs. Moreover, some devices should not be restarted after a power outage without human intervention. Many available UPSs do not provide the ability to keep a device offline once power has been restored. Other devices require that a power shutdown cycle be completed before power is restored. This requirement is not achievable by many UPS units.

SUMMARY OF THE INVENTION

Among the various objects and features of the present invention may be noted the provision of an improved power shedding device for use with uninterruptible power supplies and the like.

Another object is the provision of such a power shedding device which allows the order in which equipment is shed to be easily and readily defined by the user.

A third object is the provision of such a power shedding device which permit the user to preset the amount of time each piece of equipment remains under power after an alarm.

A fourth object is the provision of such a power shedding device which is usable with most uninterruptible power supplies without modification.

A fifth object is the provision of such a power shedding device which allows existing power monitoring software to be used without modification.

A sixth object is the provision of such a power shedding device which permits manual selection of power outlets independent of any preset shedding profile.

A seventh object is the provision of such a power shedding device which allows the shutdown sequence to be completed regardless of when the power returns.

An eighth object is the provision of such a power shedding device which is relatively inexpensive and easy to construct.

Other objects and features will be in part apparent and in part pointed out hereinafter.

Briefly, a power shedding device of the present invention controls the application of power from a power unit such as an uninterruptible power supply to a plurality of loads. The power shedding device includes circuitry for detecting an alarm signal indicative of a condition requiring the rationing of power from a power unit, and a plurality of power outputs adapted for connection to a plurality of loads. A controller, such as a microprocessor controls the application of power to each power output such that the application of power to a first power output is independent of the application of power to a second power output. Manually operable switches are provided for presetting shedding profiles for the power outputs. The controller is responsive to receipt of an alarm signal to shed each power output in accordance with its corresponding manually preset shedding profile.

BRIEF DESCRIPTION OF THE DRAWINGS

Similar reference characters indicate similar parts throughout the several views of the drawings.

DESCRIPTION OF THE PREFERRED EMBODIMENTS

Figure 1A:
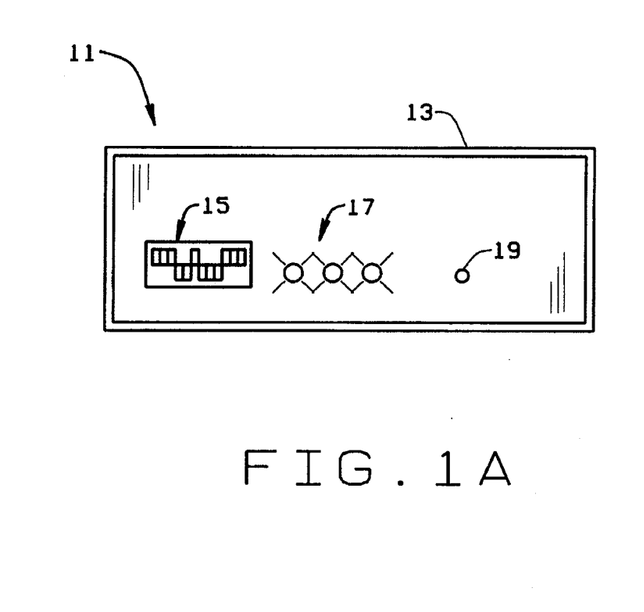
FIG. 1A is a from elevation of a power shedding device of the present invention.
Figure 1B:
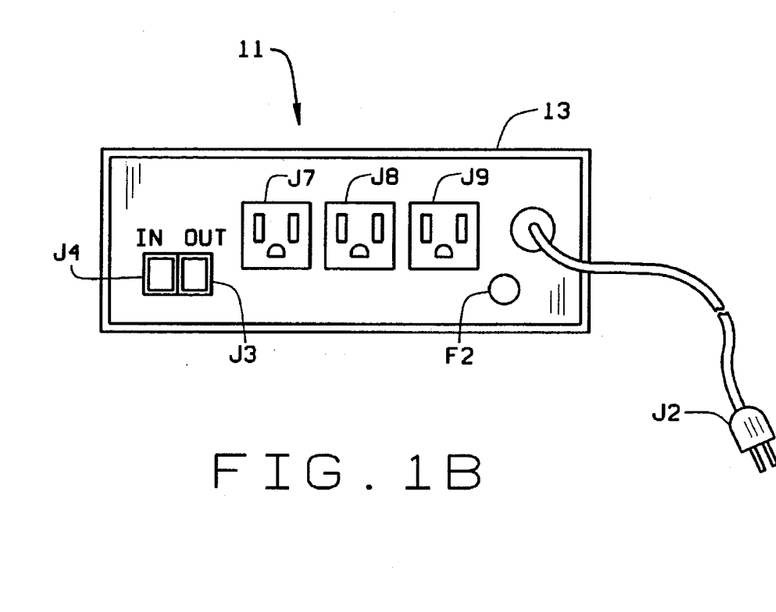
FIG. 1B is a rear elevation of the power shedding device of FIG. 1.
Figure 2:
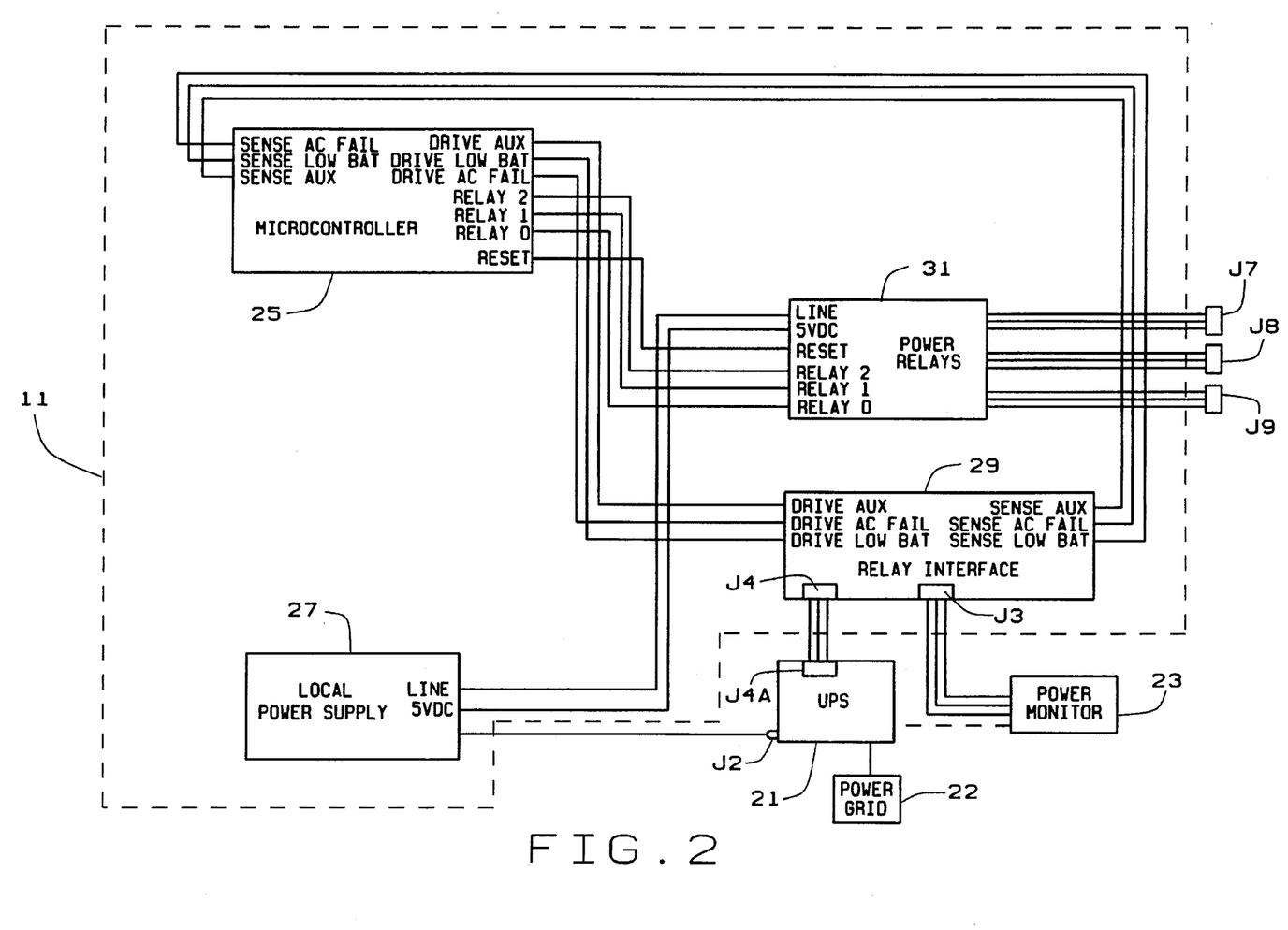
FIG. 2 is a block diagram of the electronic components of the power shedding device of the present invention connected to an uninterruptible power supply and a power monitoring device such as a computer with suitable monitoring software.

Turning now to the drawings and more particularly to FIGS. 1A and 1B, a power shedding device 11 of the present invention includes a housing 13 having a set of DIP switches 15, a set of three light emitting diodes (LEDs) 17, and a single normally open, manually operable push-button switch 19. The rear of the housing includes a pair of RJ12 connectors J3 and J4 marked "In" and "Out" respectively, a set of three power outlets J7, J8 and J9, a fuse F2, and a power connector J2. As will become apparent, these various components are electrically connected to the circuitry of power shedding device 11 shown in block form in FIG. 2. As shown in FIG. 2, the power shedding device is designed for use with an uninterruptible power supply (UPS) 21 connected to a power grid 22, although it is not limited to use in that combination. The power shedding device is also designed to be compatible with existing power monitoring devices such as power monitor 23, which may simply be a computer receiving power from UPS 21 and running appropriate conventional power monitoring software.

The major portions of the components of the power shedding device 11 are a microcontroller 25, a local power supply 27, a relay interface 29, and a power relay circuit 31. Local power supply 27 receives power from LIPS 21 as shown, and supplies 5-volt and line power to the power relay circuitry 31. The power relay circuitry is controlled by microcontroller 25 in the manner described below, and under that control provides power to power outlets J7, J8 and J9. UPS 21 has a conventional RJ12 alarm connector J4A which is connected to the "In" connector J4 of power shedding device 11. The alarm signals from UPS 21 are provided to microcontroller 25 via alarm connector J4 and relay interface circuitry 29. The microcontroller, in turn, supplies those alarms signals back through the relay interface circuitry (as described below) to the "Out" connector J3 and the power monitor 23. Typical alarm signals are AC-Fail (indicating a power grid failure), Low-Bat (indicating a low UPS battery condition), and an auxiliary alarm Aux. It should be appreciated that other alarm signals could be used as well and it is not required that the alarm signals be received from a UPS.

From the point of view of the power monitor, the signals from connector J3 are exactly the same as would be received directly from the UPS, but those alarm signals from the UPS are also used by microcontroller 25 in controlling the power relays, all as described below.

Figure 3:
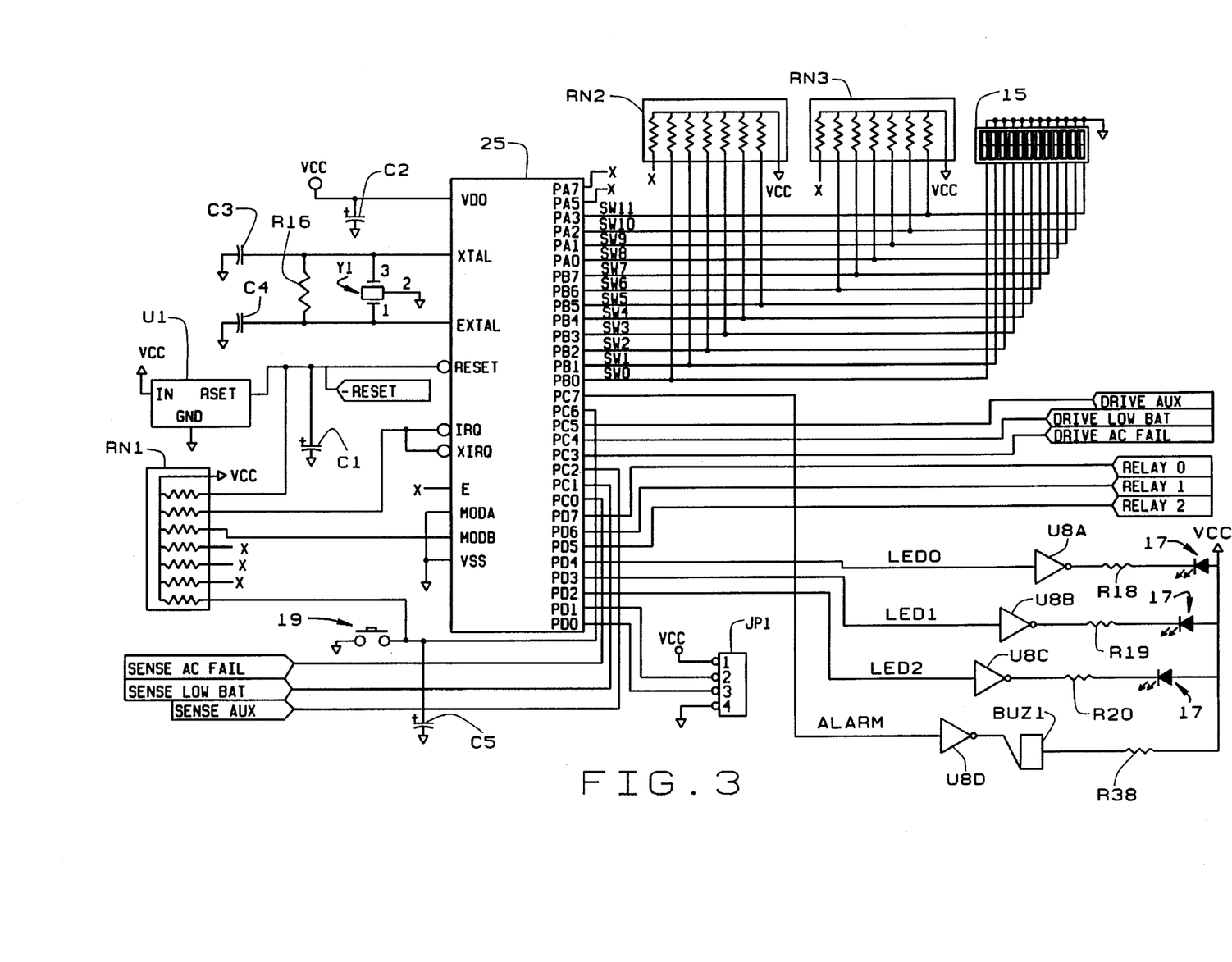
FIG. 3 is an electrical schematic of a controller portion of the power shedding device of the present invention.

Turning to FIG. 3, microcontroller 25 is preferably a microprocessor operating under programmed control. A Motorola 68HC11-type microprocessor has been found to operate satisfactorily for this purpose. Microcontroller 25 is suitably connected to a crystal Y1, which is preferably a 8.0 MHz crystal, although the present invention does not require a particularly fast clock speed. The reset pin of microcontroller 25 is connected to a reset generator U1, such as an MC34064 type reset generator from Motorola. It is known that such reset generators output a reset signal upon detection of an undervoltage (power failure) condition. The reset pin of microcontroller 25 is also connected (through a resistor network RN1 of 4.7 K-ohm resistors) to switch 19, discussed above. The other side of switch 19 is connected to ground so that closure of the switch provides a reset signal to the reset pin of the microcontroller. Switch 19 is also connected through separate 4.7 K-ohm resistors of resistor network RN1 to the interrupt and mode B pins of microcontroller 25.

The "A" and "B" ports of microcontroller 25 are connected to DIP switch 15 so that microcontroller 25 can read the manually set information, discussed below. Each line is connected through a 4.7 K-ohm pullup resistor disposed in two resistor networks RN2 and RN3. The lowest three lines of the "C" port are connected to lines labeled "Sense AC Fail", "Sense Low Bat", and "Sense Aux." These lines are connected to the relay interface circuitry 29, described below, and represent a general power failure alarm, a UPS low battery condition alarm, and an auxiliary alarm condition, respectively. The microcontroller supplies corresponding output signals on the next three lines of port "C" back to the relay interface circuitry. These lines are labeled "Drive AC Fail," "Drive Low Bat," and "Drive Aux," respectively. The top two lines of port "C" are connected (through resistor network RN1) to the reset pin of the microcontroller and (through an inverter U8D) to a piezo alarm BUZ1. Piezo alarm BUZ1 provides audible indications to the user as described below.

The lowest two lines of the "D" port are of real significance to the present invention. The next three lines are connected through inverters U5C, U5B, and U5A respectively to LEDs 17 so that the microcontroller may control the lighting of these LEDs individually. The microcontroller lights these LEDs to indicate to the user which power outlets are powered, and for related signaling purposes. Each LED, therefore, corresponds to a distinct power outlet. Specifically, the LED indicators are on when the corresponding power outlet is powered up, off when the corresponding power outlet or socket is off, and flashing when socket shutdown is imminent.

Figure 4:
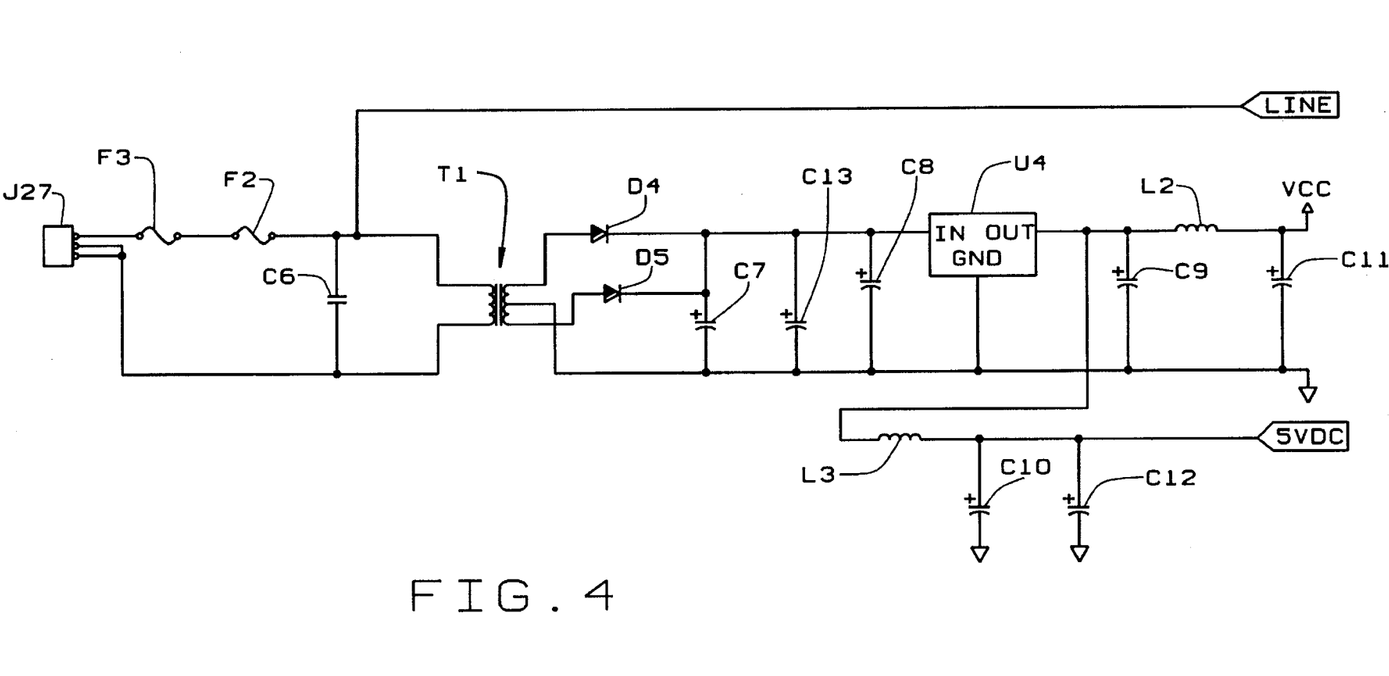
FIG. 4 is an electrical schematic of the local power supply of the power shedding device of the present invention.

The highest three lines of port "D" are used to control the power relay circuitry 31 and for this purpose are labeled Relay0, Relay 1, and Relay2, respectively Turning to FIG. 4, the local power supply is seen to be fairly conventional. Alternating current power is supplied to the circuit by means of a plug J27. One side of the line has inserted therein a 6 amp normal fuse F3, and 6 amp slow blow fuse F2. A capacitor C6 is connected across the two sides. Local line voltage is taken across the capacitor, the hot side being labeled "Line." The voltage across capacitor C6 is also supplied to a 115VAC/16VCT transformer T1 which steps down the line voltage. A pair of rectifiers D4 and D5 rectify the output of the transformer. The rectified output is filtered by three capacitors C7, C8 and C13 connected across the output, and supplied to a five-volt three terminal voltage regulator U4, such as a LM7805 type voltage regulator. The output of voltage regulator U4 is filtered by capacitors C9 and C11 in combination with an inductor L2 to provide voltage Vcc, and is also filtered by capacitors C10 and C12 in combination with an inductor L3 to provide a five volt direct current voltage 5VDC.

Figure 5A:
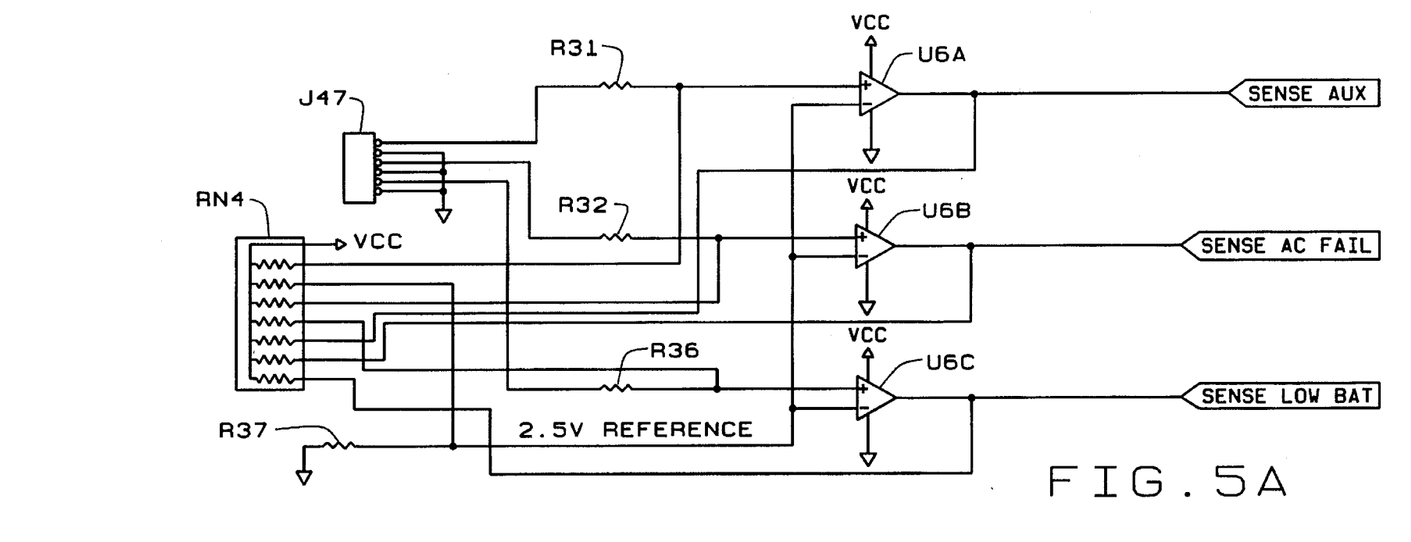
FIGS. 5A and 5B are electrical schematics of the relay interface portion of the power shedding device of the present invention.

Turning to FIG. 5 A, the input relay interface circuitry is shown. This circuitry receives the alarm signals on three lines at plug J4 from UPS 21. If these alarm signals are not available from the UPS, similar signals are available from unprotected AC outlets on the power grid and from other external alarms. It should be noted that the input relay interface circuitry is such that the inputs may vary over a wide range of voltages and input types. For example, +3 to +12 VDC inputs are usable, as are TTL and RS-232 voltage levels, common ground relays, transistor interfaces, and optocoupler interfaces. Since almost all UPSs provide one of these interfaces, the present invention is compatible with most available UPSs. These signals are supplied to individual comparators U6A, U6B, and U6C. The comparators are suitably connected to a resistor network RN4 and individual resistors R31, R32, R36 and R37 in such a way that the outputs of the comparators are buffered versions of their input signals from the LIPS. These buffered outputs are supplied via lines "Sense Aux," "Sense AC Fail," and "Sense Low Bat" to microcontroller 25.

Figure 5B:
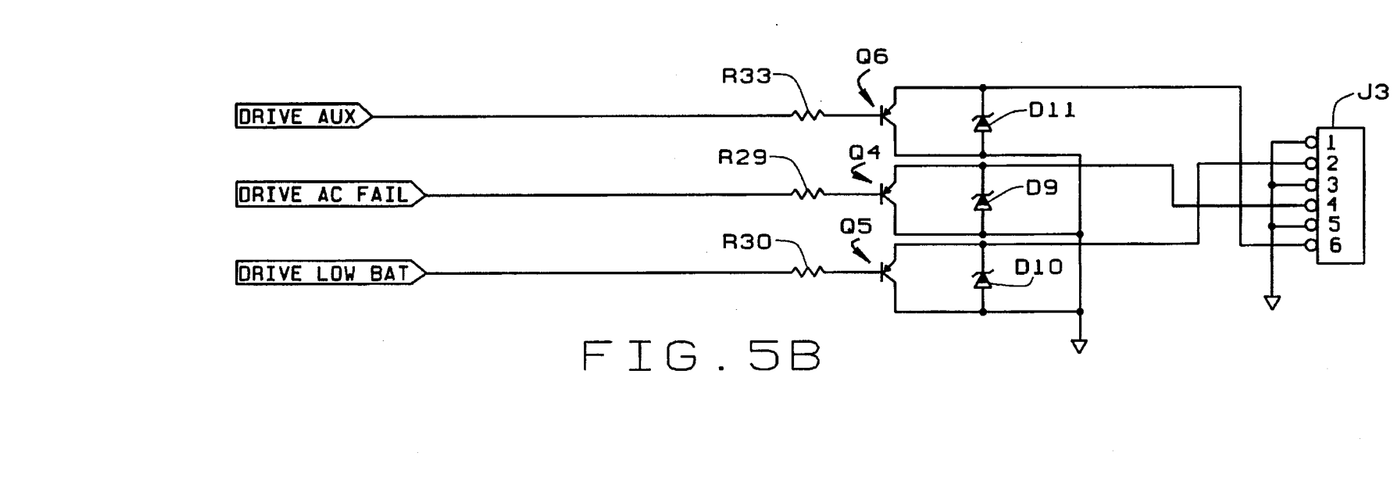

In similar fashion, the microcontroller supplies the alarm signals back to the relay interface circuitry shown in FIG. 5B on lines "Drive Aux," "Drive AC Fail," and "Drive Low Bat." These signals are supplied through 4.7 K-ohm resistors R33, R29, and R30 respectively to the bases of corresponding transistors Q6, Q4, and Q5 respectively. The output of each transistor is taken at the emitters and supplied to plug J3 for use by power monitor 23. These outputs are semiconductor contactors whose sense duplicates those of the input connector J4.

Figure 6:
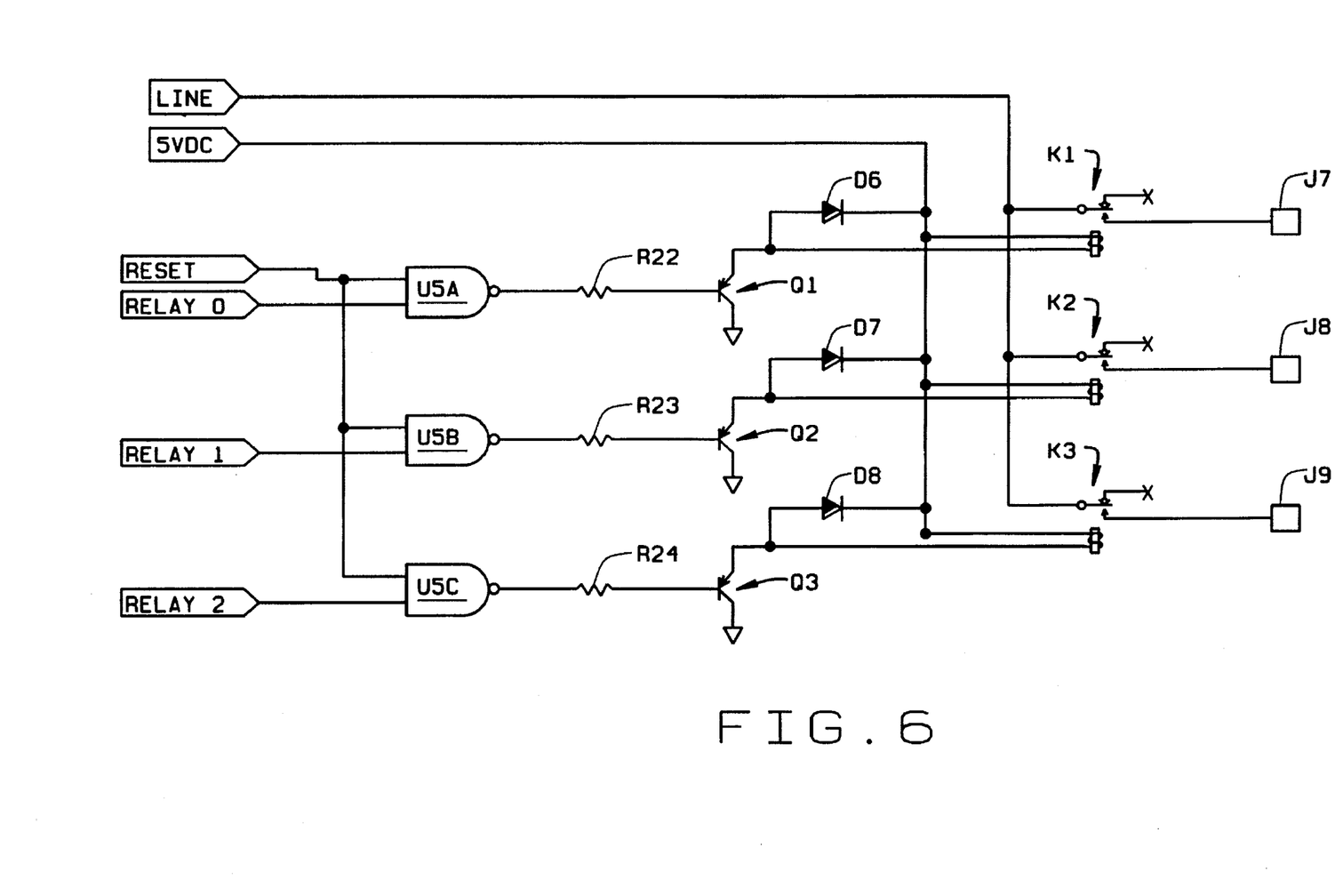
FIG. 6 is an electrical schematic of the power relay portion of the power shedding device of the present invention.

Turning to FIG. 6, microcontroller 25 controls the application of power to the power outlets J7, J8 and J9 by controlling a set of corresponding relays K1, K2 and K3. Each relay includes a movable arm connected to the line voltage from the local power supply and a pair of contacts. One contact is free floating, while the other is connected to the respective power outlet. Each relay also includes a coil which, when energized, moves the movable arm to supply power to the respective outlet. One side of each coil is connected to the 5VDC power from the local power supply, while the other side of each is connected to the relay control circuitry described below.

The relay control circuitry includes a set of three NAND gates USA, USB, and USC, each having one input connected to a "–RESET" line from the microcontroller. These NAND gates function at above two volts, as does the RESET controller, thus ensuring a valid control signal is available to the power relays to avoid inadvertent coil activation when power is initially applied to the unit. Microcontroller 25 uses this line to reset the power outlets as a group. The other input to each NAND gate is used by the microcontroller to control each power outlet individually, using the signals on lines "Relay0," "Relay 1," and "Relay2." The outputs of the NAND gates are supplied through corresponding 1 K-ohm resistors R22, R23, and R24 to the bases of transistors Q1, Q2, and Q3. The emitters of these transistors are connected to their corresponding relay coils so that a suitable signal on lines "Relay0," "Relay 1," or "Relay2" causes the circuit between the 5VDC source and ground to be completed to close the relay and energize the corresponding power outlet.

Operation of the present invention is as follows: The user manually sets the DIP switches 15 to define the operation of power shedding device 11. For example, with a twelve switch DIP switch, the sense of the alarm inputs can be defined, a "stay down" feature (described below) may be enabled or disabled, a "positive power cycling" feature (described below) may be enabled or disabled, and the power shedding profile of each outlet may be defined. In this example, the first three switches may be used to define the contact sense (normally open or normally closed) of the ac failure, low battery, and external alarm signals. The fourth switch may be used to enable or disable the stay down feature, and the fifth switch may be used to enable or disable the positive power cycling feature. Switches 6–8 are used to define the desired shedding profile of socket J7, switches 9 and 10 are used to define the desired shedding profile of socket J8, and switches 11 and 12 are used to define the desired shedding profile of socket J9.

The stay down feature of power shedding device 11 puts the device in a mode in which the user must manually press switch 19 (the OK switch) before power will be applied to the sockets. This feature is very useful for remote sites that should not be restarted without manual intervention. When the device is in the stay down mode, the microcontroller 25 does not energize the relays to power up the power outlets until the manually operable OK switch 19 is closed by the user.

The fifth switch of the DIP switch is used to signal the microcontroller 25 to set the power shedding device in the positive power cycling mode. Many systems require that power be cycled off once software shutdown has begun. The positive power cycling feature provides this function. When the power shedding device is set in this mode, the microcontroller is programmed to complete its power down sequence for each of the power outlets regardless of when the AC power returns. After completing the power down sequence for each power outlet, the microcontroller controls the power relays to return power (after grid power returns) after a ten second delay. (Of course if the device is in the "stay down" mode, the power outlets remain down until manually reset by switch 19.) In addition to shutting down the power outlets despite the return of AC power during the shutdown process, the microcontroller when operating in this mode also continues to provide the alarm signals on connector J3 until all the sockets have been powered down. This assures that software applications monitoring the alarm outputs will indeed continue their shutdown procedures until power is cycled.

Each of the three power outlets J7, J8, and J9 are separately controllable by the switches on DIP switch 15 in terms of their shedding profiles. The sixth, seventh and eighth DIP switches are used to set the shedding profile for power outlet I7. Microcontroller 25 reads these switches to determine the desired shedding profile for outlet J7. If all three switches are in the Off position, then the microcontroller controls the corresponding power relay to shed outlet J7 immediately upon receipt of an alarm signal. If the sixth and seventh switches are in the Off position and the eighth switch is in the On position, outlet I7 is shed after fifteen seconds. If the sixth and eighth switches are in the Off position and the seventh switch is in the On position, the I7 outlet is shed after two minutes. If only the sixth switch is in the Off position, outlet J7 is shed after five minutes. If the sixth switch is in the On position and the other two switches are in the Off position, the J7 outlet is shed after ten minutes. If the sixth and eighth switches are in the On position and the seventh switch is in the Off position, outlet I7 is shed after thirty minutes. If the sixth and seventh switches are in the On position and the eighth switch is in the Off position, the J7 outlet is shed after sixty minutes. And if all three switches are in the On position, the J7 outlet is shed after 120 minutes.

Power outlets J8 and J9 are controlled in a similar manner, but there are fewer choices since only two DIP switches are available for setting the shedding profile of each. (Of course, additional switches could be used if more potential shedding profiles were desired for these outlets.) With two switches available for each, each power outlet has four possible shedding profiles. These can be programmed to be the same for each outlet or different. Although the particular profile is not significant, it is preferred that the profiles for each outlet J8 and J9 be the same and that they be manually selectable from "shed immediately" to shed after sixty minutes. The two intermediate shedding profiles could be shed after two minutes and shed after ten minutes, for example.

When an AC power failure alarm is active, a Low Battery alarm input tells microcontroller 25 that the batteries of the UPS are nearly depleted. In this situation, the microcontroller in response immediately schedules all power outlets whose time remaining in the shedding process exceed two minutes for shutdown in two minutes. Those outlets scheduled for shutdown in less than two minutes continue their shutdown sequence uninterrupted.

During any power down sequence, microcontroller 25 causes the corresponding LEDs of any enabled socket to flash slowly to indicate that the power down sequence is proceeding. Fifteen seconds prior to disabling an outlet, microcontroller cause the piezo alarm to sound three times and flashes the corresponding LED more rapidly. As the socket is turned off by the microcontroller, it also extinguishes the corresponding LED. Also, fifteen seconds prior to powering up a socket, microcontroller 25 will cause it corresponding socket to flash rapidly.

The OK switch, switch 19 is monitored for switch closure by microcontroller 25 for a purpose in addition to that described above. By pressing and holding the OK switch, the user may selectively power up or power down sockets manually, regardless of the state of the alarms. To use this feature, the user presses and holds OK switch 19 until microcontroller causes the piezo alarm to beep. Successive depressions of OK switch 19 after the beep cause the microcontroller to change the LED pattern displayed on the front of the unit. Once the pattern corresponding to the desired power outlet states is displayed, the user stops pressing switch 19. After three seconds with no subsequent switch closures, the microcontroller powers up the power outlets corresponding to the selected LED pattern. Any power down sequence in effect at that time is canceled by the microcontroller. Note that if the device is operating in the stay down mode, the power outlets must be manually enabled in this manner after power down. If the user wishes to cancel the manual selection and return the power outlets to their original state, he or she simply presses and hold OK switch 19 until the microcontroller causes the piezo alarm to beep three times, indicating that the selection has been canceled.

In view of the above, it will be seen that the various objects and features of the present invention are achieved and other advantageous results obtained. The examples given herein are illustrative only and are not to be taken in a limiting sense.

What is claimed is:

1. A power shedding device for controlling the application of power from an uninterruptible power supply, comprising:
   means for detecting an alarm signal indicative of a condition requiring the rationing of power from the uninterruptible power supply;
   a plurality of power outputs adapted for connection to a plurality of loads;
   means for controlling the application of power to each power output such that the application of power to a first power output is independent of the application of power to a second power output;
   manually operable means for presetting shedding profiles for the power outputs;
   said controlling means being responsive to receipt of the alarm signal to shed each power output in accordance with its corresponding manually preset shedding profile.

2. The power shedding device as set forth in claim 1 wherein the alarm detecting means includes means responsive to a plurality of distinct alarm signals.

3. The power shedding device as set forth in claim 2 wherein the alarm detecting means is responsive to at least three distinct alarm signals.

4. The power shedding device as set forth in claim 3 wherein the alarm signal detecting means is responsive to at least one alarm signal originating from a source other than the uninterruptible power supply.

5. The power shedding device as set forth in claim 1 wherein the shedding profile of at least one of the power outputs is manually presettable to times from zero seconds to at least one hour.

6. The power shedding device as set forth in claim 5 wherein the shedding profile of at least one of the power outputs is manually presettable to a time of at least two hours.

7. The power shedding device as set forth in claim 1 wherein the manually operable shedding profile presetting means includes a set of switches.

8. The power shedding device as set forth in claim 1 wherein the power shedding device has at least three power outputs.

9. The power shedding device as set forth in claim 1 wherein the controlling means is responsive to an alarm signal to shed the power outputs in accordance with the shedding profiles independent of any termination of a corresponding alarm condition before all the power outputs are shed.

10. The power shedding device as set forth in claim 1 further including manually operable means for manually overriding the shedding profile of at least one of the power outputs.

11. The power shedding device as set forth in claim 1 wherein the controlling means has at least two modes of operation, the modes of operation being selectable by a user, further including manually operable reset means for generating a reset signal, the controlling means in one of said modes of operation being responsive to an alarm signal to shed the power outputs in accordance with the corresponding shedding profiles and to maintain said power outputs shed until receipt of the reset signal.

12. The power shedding device as set forth in claim 1 further including a plurality of visual indicators corresponding to the power outputs for visually indicating to a human user whether the respective power outputs are connected to the uninterruptible power supply.

13. The power shedding device as set forth in claim 12 wherein the visual indicators are controlled by the controlling means to provide a visual indication of the imminent shedding of their respective power outputs.

14. The power shedding device as set forth in claim 1 further including audible alarm means for sounding an alarm prior to shedding of one of the power outputs.

15. The power shedding device as set forth in claim 1 wherein said uninterruptible power supply includes an alarm output connector for providing alarm signals from the uninterruptible power supply to any compatible external device, said power shedding device further including a plug compatible with said alarm output connector for supplying alarm signals from said connector to the alarm detecting means, further including a second connector secured to the power shedding device, said second connector being substantially the same in configuration as the alarm output connector of the uninterruptible power supply, said controlling means supplying output signals to the second connector corresponding to the signals received from the alarm output connector.

16. The power shedding device as set forth in claim 1 wherein the alarm detecting means includes means for detecting an alarm indicating imminent total power loss, said controlling means being responsive to the imminent total power loss alarm to override the manually preset shedding profiles for all power outputs having a remaining time to shutdown greater than a predetermined limit.

17. The power shedding device as set forth in claim 16 wherein the predetermined limit is no greater than two minutes.

18. The power shedding device as set forth in claim 1 further including means for generating a manually initiated power output selection signal, said controlling means being responsive to the manually initiated power output selection signal to apply power from the uninterruptible power supply only to those power outputs selected by the power output selection signal.

19. The power shedding device as set forth in claim 18 wherein the controlling means is responsive to the manually initiated power output selection signal to override any on-going power down sequences initiated by an alarm signal.

20. The power shedding device as set forth in claim 18 wherein the means for generating the manually initiated power output selection signal includes manually operable means for canceling said power output selection signal.

* * * * *

UNITED STATES PATENT AND TRADEMARK OFFICE
CERTIFICATE OF CORRECTION

PATENT NO. : 5,534,734

DATED : July 9, 1996

INVENTOR(S) : William C. Pugh and John M. McNally

It is certified that error appears in the above-identified patent and that said Letters Patent is hereby corrected as shown below:

Column 1, line 16 delete "lifted" and insert --limited--;
Column 2, line 34 delete "from" and insert --front--;
Column 3, line 14, delete "LIPS" and insert --UPS--;
Column 4, line 11 delete"USC, USB and USA" and insert --U8C, U8B and U8A--;
Column 4, line 60 delete "LIPS" and insert --UPS--;
Column 5, line 19 delete "USA, USB and USC" and insert --U5A, U5B and U5C--;
Column 6, line 22, delete "I7" and insert --J7--;
Column 6, line 27 delete "I7" and insert --J7--;
Column 6, line 29, delete "I7"and insert --J7--;
Column 6, line 36 delete "I7" and insert --J7--

Signed and Sealed this

Second Day of June, 1998

Attest:

BRUCE LEHMAN

Attesting Officer

Commissioner of Patents and Trademarks